(12) United States Patent
Herbert et al.

(10) Patent No.: US 9,145,653 B2
(45) Date of Patent: Sep. 29, 2015

(54) COMPOSITE MATERIAL (75) Inventors: Jim Herbert, Holmfirth Yorkshire (GB); Paul Slater, Huddersfield Yorkshire (GB); Alan Bamforth, Holmfirth Yorkshire (GB)

(73) Assignee: A.B.G. LIMITED, Holmfirth Yorkshire (GB)

( * ) Notice: Subject to any disclaimer, the term of this patent is extended or adjusted under 35 U.S.C. 154(b) by 0 days.

(21) Appl. No.: 13/823,281

(22) PCT Filed: Sep. 14, 2011

(86) PCT No.: PCT/GB2011/051732
§ 371 (c)(1),
(2), (4) Date: Mar. 14, 2013

(87) PCT Pub. No.: WO2012/035348
PCT Pub. Date: Mar. 22, 2012

(65) Prior Publication Data
US 2013/0189034 A1 Jul. 25, 2013

(30) Foreign Application Priority Data
Sep. 14, 2010 (GB) .................................. 1015291.6

(51) Int. Cl.
*E02B 11/00* (2006.01)
*B09C 1/00* (2006.01)
*E02D 17/20* (2006.01)
*E02D 31/02* (2006.01)
*B32B 3/06* (2006.01)

(52) U.S. Cl.
CPC ................. *E02B 11/00* (2013.01); *B09C 1/005* (2013.01); *B32B 3/06* (2013.01); *E02D 17/202* (2013.01); *E02D 31/02* (2013.01); *B32B 2410/00* (2013.01); *Y10T 156/10* (2015.01); *Y10T 428/24281* (2015.01); *Y10T 428/24289* (2015.01)

(58) Field of Classification Search
USPC .......................................... 405/36, 43, 302.7
See application file for complete search history.

(56) References Cited

U.S. PATENT DOCUMENTS

| 3,795,180 A | 3/1974 | Larsen |
| 2002/0016122 A1 | 2/2002 | Curro et al. |
| 2004/0131423 A1 | 7/2004 | Ianniello et al. |

OTHER PUBLICATIONS

International Search Report for PCT/GB2011/051732, Completed by the European Patent Office on Jul. 2, 2012, 4 Pages.

*Primary Examiner* — Tara M. Pinnock
(74) *Attorney, Agent, or Firm* — Brooks Kushman P.C.

(57) ABSTRACT

A composite material made up of fluid permeable layer and a core having drainage voids between projections thereon. The core has a number of relatively large openings defined therein so that in use the fluid permeable layer may extend through the openings in response to a working load applied thereto.

19 Claims, 6 Drawing Sheets

COMPOSITE MATERIAL

CROSS-REFERENCE TO RELATED APPLICATION

This application is the U.S. national phase of PCT Appln. No. PCT/GB2011/051732 filed on Sep. 14, 2011, which claims priority to GB Patent Appln. No. 1015291.6 filed on Sep. 14, 2010, the disclosures of which are incorporated in their entirety by reference herein.

FIELD OF THE INVENTION

The present invention relates to composite materials. The present invention further relates to methods of manufacturing composite materials. The present invention still further relates to methods of providing drainage or venting using a composite material.

Background to the Invention

In geotechnical engineering, man made composite materials are used in place of soil, clay, rock and the like to provide solutions to geotechnical engineering problems. Typical composite materials used in this field comprise two or more components such as a textile sheet or sheets in combination with a grid, net or core.

One typical application for composite materials involves providing a drainage path to prevent build up of moisture or gas below ground. For example, composite materials may perform this function in landfill capping. A first, upper layer is drainage layer to remove rain water or sub-surface water or leachate from the landfill site by providing a drainage path. A second, lower layer is a drainage layer to remove gas, e.g. methane, by venting from the landfill site by providing a venting path. Similar considerations may apply to the base of a landfill site.

Figure 1:
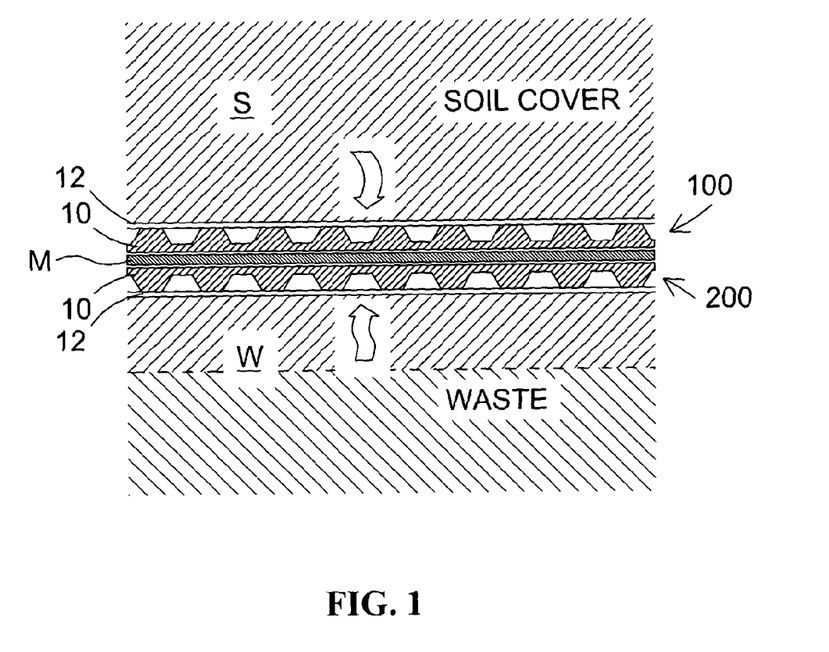
FIG. 1 shows a side sectional view of a known composite material in use.

FIG. 1 shows a side sectional view of first and second composite layers 100, 200 in use as a landfill cap, with a further substantially impermeable membrane M provided there-between. The upper, first composite layer 100 comprises a sheet made up of a core 10 coupled to a textile 12. In this installation the core 10 is of low cross permeability to water, but is permeable in its plane, whereas the textile 12 is permeable to water both in and across its plane. The textile 12 is coupled to a first face of the core 10 and is in contact with moist soil S above. A second face of the core 10 rests on the substantially impermeable membrane M. The composite layer 100 contains a number of interconnected drainage voids which allow water to run generally across the first face of the core 10 within the composite layer 100. Moisture from the soil S passes through the textile 12 and then drains under gravity through the core 10. In this way the composite layer 100 facilitates drainage of moisture from the soil S.

The composite layer 200 is of generally the same construction as the composite layer 100, but arranged in an inverted configuration with gas able to rise from the waste W and pass through the textile layer 12 for venting by passing through the drainage voids. The substantially impermeable membrane M is provided as a further degree of separation, as typically called for in the regulatory provisions concerning this type of installation.

Composite materials used in landfill capping are often applied to sloping surfaces, and may be laid over or under a number of possible substrates. The core material generally has relatively low frictional engagement with the substrates. This brings problems of ensuring that the composite material is stable under shearing forces resulting from the weight of material above, both in terms of maintaining the components of the composite in the correct arrangement with one another, and in terms of preventing the composite material itself slipping relative to material adjacent to it. One solution is to employ a further, friction-enhancing layer, which is typically bonded onto the core. However, this solution increases costs.

Example embodiments of the present invention aim to address at least one disadvantage of the prior art, whether identified herein or otherwise.

SUMMARY OF THE INVENTION

In a first aspect, the present invention provides a composite material comprising: a core sheet and a cover sheet, the composite material comprising one or more drainage voids associated with the core sheet, the drainage voids arranged to allow fluid to move there-through; and further comprising an opening in the core sheet, the opening arranged to allow the cover sheet to extend in use through the core sheet from a first side thereof to a second side thereof.

Suitably, the cover sheet and opening are arranged such that the cover sheet extends in use through the core sheet in response to loading provided onto the cover sheet.

In use, such a composite material enables the cover sheet to contact material adjacent to the second side of the core sheet, e.g. the substrate on which the second side of the core sheet rests, thereby enhancing frictional engagement between the composite material and such material. Interaction between the cover sheet and the core sheet in areas around the openings in the core sheet may further enhance engagement of the cover sheet with the core sheet. Furthermore, the core sheet openings reduce the amount of relatively expensive core material needed in certain installations.

Herein, the term "fluid" is to be understood as including any non-solid substance, for example liquids, gases, and combinations thereof. Equally, the term "drainage" includes drawing off of liquid, and venting of gases. Reference to the cover sheet extending in use through an openings in the core sheet is to be understood as the core sheet laying or being present through the openings, for example in a static configuration.

Suitably, the composite material comprises a sheet. Suitably, the composite material comprises a roll of material.

Suitably, the drainage voids are provided between a first side of the core sheet and the cover sheet between a first side of the core sheet and the cover sheet.

Suitably, the core sheet comprises one or more projections on the first side thereof comprising the drainage voids therebetween. Suitably, the core sheet comprises recessed portions providing the drainage voids. Suitably, the drainage voids are bounded in part by the cover sheet, and in part by the first side of the core sheet. Suitably, the core sheet comprises one or more projections on the second side thereof. Suitably, the core comprises a random fibre core. Suitably, the core comprises a net core. Suitably, the drainage voids are arranged to enable fluid to move through the core in three dimensions. Suitably, the drainage voids are arranged to enable fluid to move across the first side of the core sheet in two non-parallel directions. Suitably, the drainage voids are arranged to provide a continuous fluid path through the composite material in a one direction, or in two non-parallel directions. Suitably, the drainage voids are arranged to enable fluid to move across the first side of the core sheet from one end thereof to another. Suitably, the drainage voids are arranged to enable fluid to move across the first side of the core sheet from one side thereof to another. Suitably, the drainage voids are arranged to enable fluid to move across the first side of the core sheet from one end thereof to another and from one side thereof to another. Suitably, the drainage voids are mutually interconnected, preferably all mutually interconnected. Suitably the core sheet comprises a plurality of projections on one or both of first and second sides thereof. Suitably, the projections are of substantially similar shape to each other. Suitably, the projections are distributed in regular arrangement across the core sheet.

Suitably, the core sheet comprises a plurality of openings.

Suitably, the or each opening in the core sheet has a boundary comprising a strip of core sheet material. Suitably, the or each opening in the core sheet is surrounded by a strip of core sheet material. Suitably, the openings are arranged with a strip of core sheet material there-between. Suitably, the strip or strips of core sheet material comprise the drainage voids thereon. Suitably, the strip or strips of core sheet material comprise the projections thereon. Suitably, the openings and strips of core sheet material are arranged in a regular repeating pattern, preferably a grid or grid-like pattern. Suitably, the core material comprises drainage voids that form a first, micro drainage structure of the core sheet, and the core material between openings in the core sheet defines a macro drainage structure. Suitably, the micro drainage structure is provided by drainage voids within the core material. Suitably, the core sheet has a boundary comprising strips of core sheet material.

Suitably, the openings are generally rectangular in shape. Suitably, the openings are generally square in shape. Suitably, the openings are generally triangular in shape. Suitably the openings are generally oval in shape. Suitably, the openings are generally circular in shape. Suitably, the openings are of substantially similar shape to each other. Suitably, the openings are distributed in regular arrangement across the core sheet.

Suitably, the openings comprise more than 10% of the area of the core sheet, preferably more than 20% of the area, more preferably more than 30%, preferably more than 40%, for example more than 50% of the area of the core sheet. Suitably, the openings comprise up to 90% of the area of the core sheet, preferably up to 80%, more preferably up to 70%, preferably up to 60%, for example up to 55% of the area of the core sheet. In especially preferred embodiments, the openings comprise approximately 50%-60% of the area of the core sheet.

Suitably, the openings have a width dimension of greater than 25 mm across the core sheet, preferably greater than 50 mm, more preferably greater than 100 mm, even more preferably greater than 500 mm, for example greater than 1000 mm across the core sheet. Suitably, the openings have a length dimension of greater than 25 mm across the core sheet, preferably greater than 50 mm, more preferably greater than 100 mm, even more preferably greater than 500 mm for example greater than 1000 mm across the core sheet.

Suitably, the strips of core sheet material have dimensions of greater than 25 mm, preferably greater than 50 mm, more preferably greater than 75 mm, for example 100 mm separating openings on the core sheet.

Suitably, the core sheet is made of a fluid impermeable material, and/or has a fluid impermeable outermost layer. Suitably, the core sheet is made of a water impermeable material, and/or has a water impermeable outermost layer. In alternative embodiments the core sheet may comprise a fluid permeable material, or comprise fluid permeable portions, for example to give in plane permeability. Suitably, the drainage voids are provided by fluid permeable portions of the core sheet.

Suitably, the core sheet comprises HDPE.

Suitably, the cover sheet is fluid permeable. Suitably, the cover sheet is water permeable. Suitably, the cover sheet is gas permeable. Suitably, the cover sheet comprises a textile. Suitably, the cover sheet comprises a non-woven textile. Suitably, the cover sheet comprises a plastics material. Suitably, the cover sheet comprises a polypropylene material. Suitably, the cover sheet comprises a long staple fibre material. Suitably, the cover sheet comprises a needle punched material. Suitably, the cover sheet comprises a heat-treated material.

Suitably, the cover sheet is fixedly coupled to the core sheet. Suitably, the cover sheet is fixedly coupled to the core sheet by adhesive, or by a thermal or other welding process.

Suitably, the cover sheet is coupled to projections of the core sheet. Suitably, the cover sheet is coupled to projections of the core sheet such that the drainage voids are provided in the space between cover sheet and the first side of the core sheet.

Suitably, the cover sheet and the core sheet extend over the same area. Suitably, the cover sheet covers the entirety of the core sheet. Suitably, the cover sheet covers the entirety of the openings in the core sheet.

Suitably, in use the core sheet is generally incompressible in response to an applied working load. Suitably, the cover sheet comprises predefined regions arranged to at rest extend through the core sheet from a first side thereof to a second side thereof. Suitably, the cover sheet comprises predefined baggy regions adjacent to the openings. Suitably, the cover sheet comprises pre-shaped regions adjacent to the openings. Suitably, the cover sheet is extensible from a rest position in which it lies above the first side of the core sheet to an in use position in which it extends through the openings in the core sheet from the first side thereof to the second side thereof in response to an applied working load provided onto the cover sheet from material pressed or pressing against the cover sheet.

Suitably, the composite material comprises a cover sheet which extends through openings in the core sheet, and which is coupled to a second cover sheet which lies generally on the other side of the core sheet to the cover sheet.

In a second aspect, the present invention provides a method of manufacturing a composite material, the method comprising forming an opening in a core sheet comprising drainage voids arranged to allow fluid to run there-through, wherein the opening so formed allows communication between the first side and the second side of the core sheet, and further comprising applying a cover sheet to the first side of the core sheet.

Suitably, the method comprises stamping out a region(s) of the core sheet to form the opening(s) therein.

Suitably, the method comprises coupling the core sheet to the cover sheet.

Suitably, the coupling step comprises adhering or welding the core sheet to the cover sheet.

Suitably, the cover sheet and/or the core sheet is substantially as described above in relation to the first aspect of the present invention.

In a third aspect the present invention provides a method of providing drainage using the composite material of the first aspect of the present invention, or a composite material manufactured according to the second aspect of the present invention, the method comprising: installing the composite material in material to be drained such that the cover sheet is in contact with the material to be drained or vented, such that the cover sheet extends through the openings to engage material adjacent to the second side of the core sheet.

Suitably, the cover sheet extends through the openings in response to a load applied to the cover sheet.

Suitably, the step of applying load to the cover sheet is performed by covering the composite material with material such that the weight of said material acts on the composite material. Suitably, the step of applying load to the cover sheet is performed by covering the composite material with soil. Suitably, the step of applying the load presses baggy portions of the cover sheet through the openings. Suitably, the step of applying the load comprises stretching the cover sheet from a rest position in which it does not extend through the openings. Suitably, the step of applying the load comprises elastically deforming the cover sheet.

Suitably, the method comprises installing the composite material with the cover sheet generally upward facing and the second side of the core sheet generally downward facing, such that the composite material rests on a material substrate, and thereafter providing a working load to the cover sheet. Suitably, the working load is provided, at least in part, by weight of material provided to cover the composite material. Suitably, the working load is provided, at least in part, by the weight of material to be drained provided onto the cover sheet.

Suitably, the method comprises installing the composite material with the cover sheet generally downward facing and the second side of the core sheet generally upward facing, such that the composite material rest on a substrate of material to be vented, and thereafter applying a working load to the second side of the core sheet. Suitably, the working load is provided, at least in part, by weight of material provided to cover the composite material.

Suitably, the method comprises installing the composite material at an angle inclined to the horizontal. Suitably, the method comprises installing the composite material at an angle inclined to the horizontal in two directions.

In a fourth aspect of the present invention there is provided a drainage structure or a venting structure including the composite material of the first aspect of the invention or a composite material manufactured according to the second aspect of the present invention, or provided using a method of providing drainage or venting according to the third aspect of the invention.

In a fifth aspect of the present invention there is provided a core sheet for use in the composite material of the first aspect of the present invention. In a sixth aspect of the present invention there is provided a kit of parts for assembly into a composite material according to the first aspect of the present invention. Suitably, the kit comprises a core sheet and a cover sheet.

BRIEF INTRODUCTION TO THE DRAWINGS

For a better understanding of the invention, and to show how embodiments of the same may be carried into effect, reference will now be made, by way of example, to the accompanying diagrammatic drawings in which.

DESCRIPTION OF EXAMPLE EMBODIMENTS

Figure 2A:
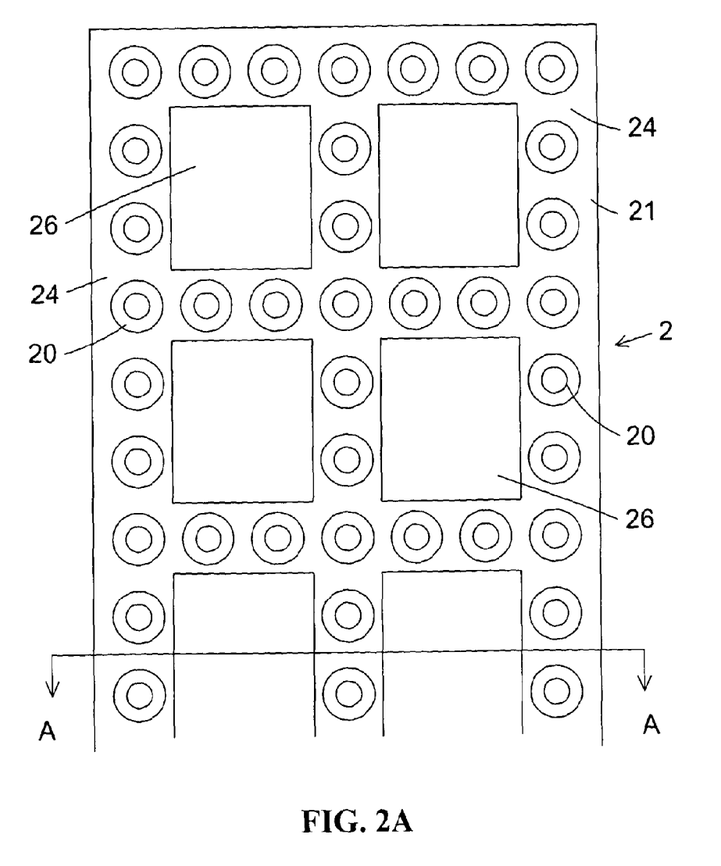
FIGS. 2A and 2B show plan views of components for a composite material in accordance with example embodiments of the present invention.
Figure 2B:
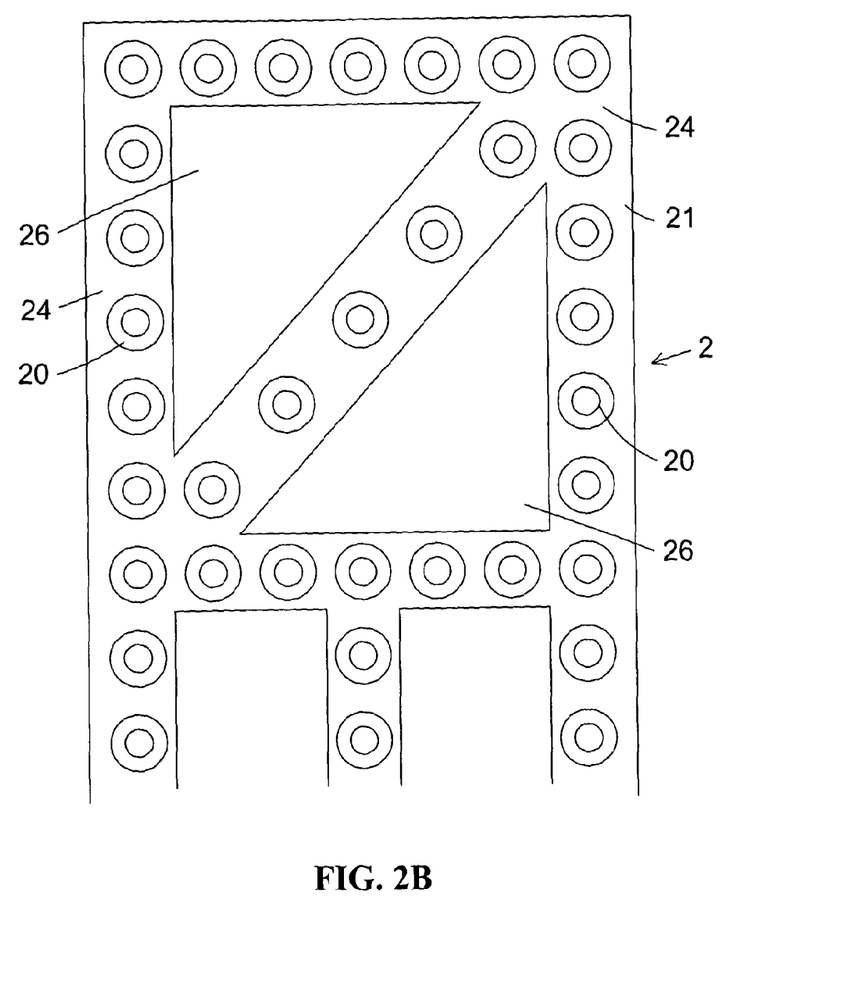
Figure 3:
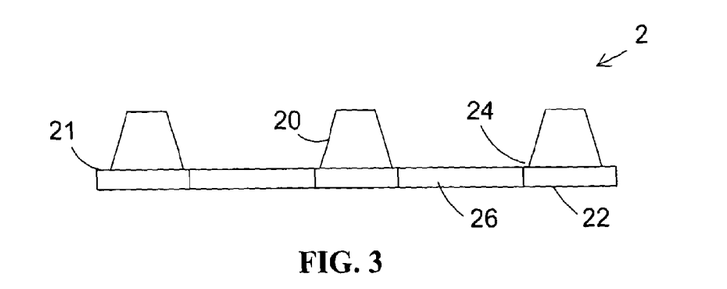
FIG. 3 shows a sectional view along line A-A of FIG. 2A, looking in the direction of the arrows.
Figure 4:
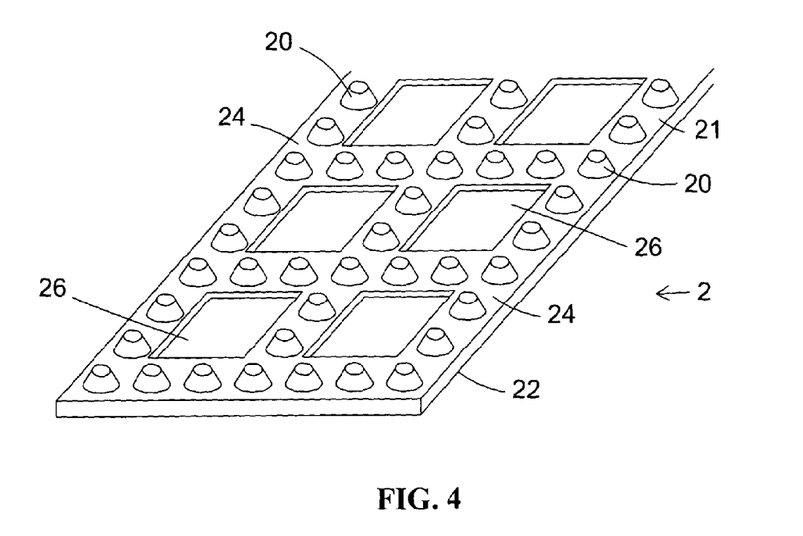
FIG. 4 shows a perspective view of the component of FIG. 2A from above and one end.

FIGS. 2-4 show components for a composite material in accordance with an example embodiment of the present invention. The components are each referred to as a core sheet 2. The core sheet 2 is a sheet of material comprising a plurality of projections 20 extending from a first face 21 thereof. The spaces on the first face 21 and the spaces between the projections 20 define a plurality of interconnected drainage voids 24 that allow fluid to run across the first face 21 of the core sheet 2. The core sheet 2 further comprises a plurality of openings 26 defined therein to allow communication between the first face 21 and a second, opposite face 22. FIG. 2A shows a core sheet 2 with a single type of rectangular openings, whereas FIG. 2B shows a core sheet 2 with both rectangular and triangular openings.

Figure 5:
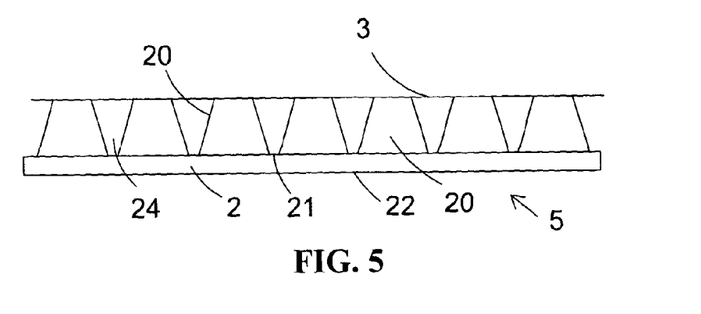
FIG. 5 shows an end view the component of FIG. 2A in combination with a second component to provide a composite material in accordance with an example embodiment of the present invention.

FIG. 5 shows the core sheet 2 used as the first component of in a composite material 5. The composite material 5 comprises the first core sheet 2 in combination with a cover sheet 3. The cover sheet 3 is a water permeable sheet, and is fixedly coupled to projections of the core sheet 2 such that the cover sheet 3 covers the entirety of the core sheet 2.

Figure 6:
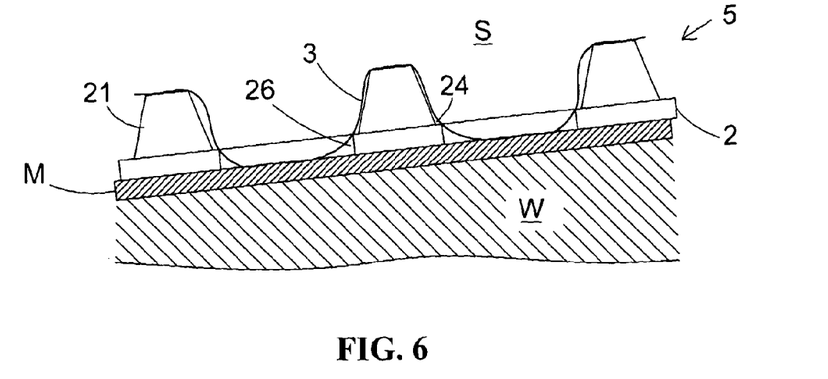
FIG. 6 is a side sectional view of the component of FIG. 2A in use in a drainage structure according to an example embodiment of the present invention.

FIG. 6 shows a side sectional view of the composite material 5 including the core sheet 2 in use in a drainage structure. In this drainage structure the second face 22 of the core sheet 2 rests on a substantially impermeable membrane M, which itself lies on waste W. The cover sheet 3 is fixed to the first face 21 of the core sheet 2 at the projections 20 and is in contact with moist soil S. The interconnected drainage voids, formed between projections 20 on the first face of the core sheet 2 and between the first face of the core sheet 2 and the cover sheet 3 allow moisture from the soil S to run generally across the first face of the core sheet 21 within the composite material 5 to facilitate drainage of moisture from the soil S. The weight of the soil S pressing on the cover sheet 3 presses the cover sheet 3 down and through the openings 26 in the core sheet. In this way the relatively high frictional resistance to sliding of the cover sheet 3 over the substantially impermeable membrane M is achieved, while maintaining good drainage performance using the portions of core material in the core sheet 2 that surround the openings 26. In embodiments where there is no fixed coupling between the core sheet 2 and the cover sheet 3, again frictional engagement there-between to resist shearing forces is enhanced by the effect of the cover sheet 3 pressing on the projections 20 e.g. on side portions thereof, and/or the effect of the cover sheet 3 pressing against the edges of the openings 26. There are a number of factors in determining the degree to which the cover sheet extends into and through the openings, including one or more of: the loading applied to the cover sheet, the depth of the core sheet, the size and shape of any projections on the cover sheet, the size of the openings, any pre-shaping of the cover sheet and the material properties of the cover sheet. It will be appreciated that embodiments of the present invention provide to suitable combinations of these factors to work effectively in typical underground drainage situations where shearing loads may be a design consideration.

In other embodiments (not shown) the composite material may comprise a second cover sheet layer in addition to the core sheet and the cover sheet. The second cover sheet lies generally on the other side of the core sheet to the cover sheet. The cover sheet extends through openings in the core sheet, either on manufacture, or in response to a loading applied in use. The these embodiments, the cover sheet is coupled to a second cover sheet at the openings in the core, for example by adhesive, and may extend the suitability of the composite material into various applications.

Surprisingly, the presence of the openings 26 in the core sheet 2 does not have a significant adverse affect on the drainage capacity provided by the composite material 5. However, the composite material 5 includes a smaller amount of material and is hence lighter than an equivalent material without openings 26. In addition to weight saving, the use of a smaller amount of material can reduce manufacturing costs.

Figure 7:
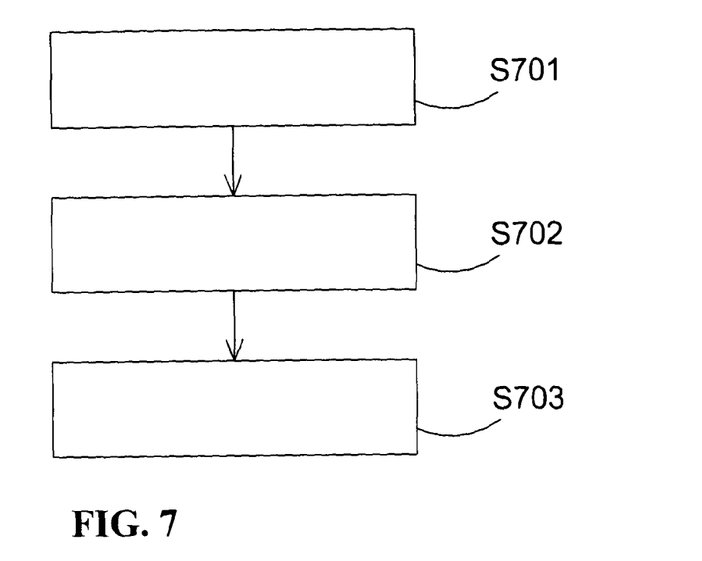
FIG. 7 is a schematic flow diagram illustrating a method of manufacturing a component for a composite material and of manufacturing a composite material according to example embodiments of the present invention.

FIG. 7 is a schematic flow diagram illustrating a method of manufacturing a core sheet for a composite material (steps S701 and S702) and of manufacturing a composite material (S703), according to example embodiments of the present invention.

At step S701 the core sheet is produced, the core sheet comprising a first face with one or drainage voids to allow fluid to run across the first face and further comprising a second face. The core sheet suitably comprises a plastics material, with the drainage voids provided between projections of a plurality of projections on the first face thereof.

The second step S702 comprises forming openings in a component to allow communication between the first face and the second face of the component. The second step S702 conveniently comprises stamping out the openings.

At the third step the core sheet manufactured in steps S701 and S702 is combined with a cover sheet to form a composite material. The third step S703 comprises bonding the core sheet to a cover sheet by adhering and/or welding. The cover sheet comprises a fluid permeable layer. In an alternative method of manufacturing, the core sheet may be formed by combining separate portions of core material such as strips of core material, e.g. by overlaying, weaving, bonding or otherwise coupling. In yet another alternative method of manufacturing, the openings in the core sheet may be formed or resized by stretching of the core sheet.

Figure 8:
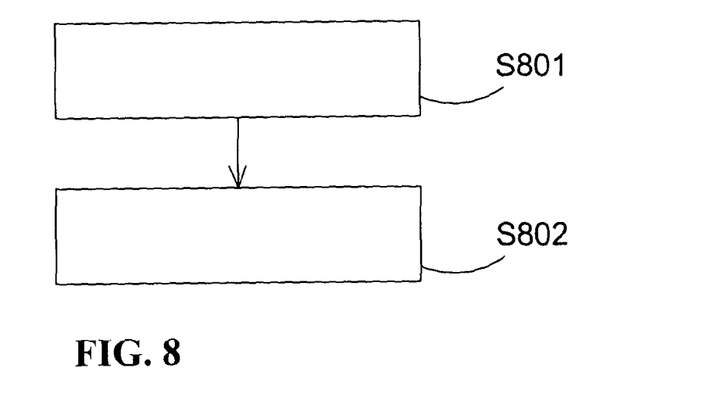
FIG. 8 is a schematic flow diagram of a method of providing drainage using a composite material according to an example embodiment of the present invention.

FIG. 8 is a schematic flow diagram of a method of providing drainage using a composite material according to an example embodiment of the present invention. The method comprises a first step S801 of installing a composite material as described herein, e.g. the composite material 5 on a substrate such that the second face of the core sheet of the composite material is supported by a substrate. The method further comprises the step S802 of placing material to be drained against the, fluid permeable cover sheet of the composite material such that the cover sheet is pressed through openings in the core sheet to contact and frictionally engage the substrate. The method may suitably further comprise providing a connection between the composite material and a further drainage structure to carry away fluid that enters into the composite material.

The components, composite materials and methods described herein are relatively cheap to produce and implement, and address the problem of insufficient friction between components in the composite material and between a composite material and substrate.

Although the embodiments described herein are intended for drainage of water from moist soil, other related embodiments can also be envisaged as suitable for draining other fluids, including gasses, from other media. Furthermore, the embodiments described may be combined with other components, for example by addition one or more further layers, according to particular engineering requirements.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A composite material for use in geotechnical engineering, comprising: a core sheet and a cover sheet, the composite material comprising one or more drainage voids associated with the core sheet, the drainage voids provided between a first side of the core sheet and the cover sheet and arranged to allow fluid to move there-through; and further comprising at least one opening in the core sheet, the opening arranged to allow the cover sheet to extend in use through the core sheet from a first side thereof to a second side thereof, wherein the cover sheet and opening are arranged such that the cover sheet extends in use through the core sheet and is coupled to a second cover sheet which lies generally on the other side of the core sheet to the core sheet.

2. The composite material of claim 1, wherein the cover sheet extends through the core sheet in response to loading provided onto the cover sheet.

3. The composite material of claim 1, wherein the core sheet comprises one or more projections on the first side thereof comprising the drainage voids there-between.

4. The composite material of claim 1, wherein the core sheet material comprises drainage voids that form a first, micro drainage structure of the core sheet, and the core material between openings in the core sheet defines a macro drainage structure.

5. The composite material of claim 1, wherein the core sheet comprises projections, and wherein the composite material comprises a cover sheet that is coupled to projections of the core sheet such that the drainage voids are provided in the space between cover sheet and the first side of the core sheet.

6. The composite material of claim 1, wherein in use the core sheet is generally incompressible in response to an applied working load.

7. The composite material of claim 1, wherein the cover sheet comprises predefined regions arranged to at rest extend through the core sheet from a first side thereof to a second side thereof.

8. The composite material of claim 1, wherein the cover sheet comprises predefined baggy regions adjacent to the openings.

9. The composite material of claim 1, wherein the cover sheet comprises pre-shaped regions adjacent to the openings.

10. The composite material of claim 1, wherein the cover sheet is extensible from a rest position in which it lies above the first side of the core sheet to an in use position in which it extends through the openings in the core sheet from the first side thereof to the second side thereof in response to an applied working load provided onto the cover sheet from material pressed or pressing against the cover sheet.

11. A method of manufacturing a composite material, the method comprising forming an opening in a core sheet comprising drainage voids arranged to allow fluid to run there-through, wherein the opening so formed allows communication between the first side and the second side of the core sheet, and further comprising applying a cover sheet to the first side of the core sheet to produce the composite as described above in claim 1.

12. A method of providing drainage or venting using a composite material for use in geotechnical engineering, the composite material comprising: a core sheet and a cover sheet, the composite material comprising one or more drainage voids associated with the core sheet, the drainage voids provided between a first side of the core sheet and the cover sheet and arranged to allow fluid to move there-through; and further comprising at least one opening in the core sheet, the opening arranged to allow the cover sheet to extend in use through the core sheet from a first side thereof to a second side thereof, wherein the cover sheet and opening are arranged such that the cover sheet extends in use through the core sheet, the method comprising: installing the composite material in material to be drained such that the cover sheet is in contact with the material to be drained or vented, such that the cover sheet extends through the openings to engage material adjacent to the second side of the core sheet.

13. The method of claim 12 comprises installing the composite material with the cover sheet generally upward facing and the second side of the core sheet generally downward facing, such that the composite material rests on a material substrate, and thereafter providing a working load to the cover sheet.

14. The method of claim 13 wherein the working load is provided, at least in part, by the weight of material to be drained provided onto the cover sheet.

15. The method of claim 12 comprises installing the composite material with the cover sheet generally downward facing and the second side of the core sheet generally upward facing, such that the composite material rest on a substrate of material to be vented, and thereafter applying a working load to the second side of the core sheet.

16. A method of providing drainage or venting using a composite material for use in geotechnical engineering, the composite material comprising: a core sheet and a cover sheet, the composite material comprising one or more drainage voids associated with the core sheet, the drainage voids provided between a first side of the core sheet and the cover sheet and arranged to allow fluid to move there-through; and further comprising at least one opening in the core sheet, the opening arranged to allow the cover sheet to extend in use through the core sheet from a first side thereof to a second side thereof, wherein the cover sheet and opening are arranged such that the cover sheet extends in use through the core sheet, the method comprising: installing the composite material in material to be drained such that the cover sheet is in contact with the material to be drained or vented, such that the cover sheet extends through the openings to engage material adjacent to the second side of the core sheet, wherein the step of applying load to the cover sheet is performed by covering the composite material with material such that the weight of said material acts on the composite material.

17. The method of claim 16, wherein the step of applying the load comprises stretching the cover sheet from a rest position in which it does not extend through the openings.

18. The method of claim 16 wherein the step of applying the load comprises elastically deforming the cover sheet.

19. A method of providing drainage or venting using a composite material having a core sheet and a cover sheet, with one or more drainage voids associated with the core sheet, the drainage voids provided between a first side of the core sheet and the cover sheet and arranged to allow fluid to move there-through and further having at least one opening in the core sheet arranged to allow the cover sheet to extend in use through the core sheet from a first side thereof to a second side thereof, the method comprising:
  installing the composite material in material to be drained such that the cover sheet is in contact with the material to be drained or vented, such that the cover sheet extends through the openings to engage material adjacent to the second side of the core sheet; and
  applying a load to the cover sheet by covering the composite material with material such that the weight of said material acts on the composite material;
  wherein the step of applying the load presses baggy portions of the cover sheet through the openings.

* * * * *